(12) United States Patent
Comsa et al.

(10) Patent No.: US 10,233,070 B2
(45) Date of Patent: Mar. 19, 2019

(54) REFRIGERATOR WITH AUTOMATIC LIQUID DISPENSER

(71) Applicant: Electrolux Home Products, Inc., Charlotte, NC (US)

(72) Inventors: Cornel Comsa, Anderson, SC (US); Zhuochen Shi, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 15/834,297

(22) Filed: Dec. 7, 2017

(65) Prior Publication Data

US 2018/0099857 A1 Apr. 12, 2018

Related U.S. Application Data

(60) Continuation of application No. 15/419,204, filed on Jan. 30, 2017, now Pat. No. 9,890,029, which is a
(Continued)

(51) Int. Cl.
*B67D 1/12* (2006.01)
*B67D 7/22* (2010.01)
(Continued)

(52) U.S. Cl.
CPC ......... *B67D 1/1238* (2013.01); *B67D 1/0006* (2013.01); *B67D 1/0857* (2013.01);
(Continued)

(58) Field of Classification Search
CPC ..... F25D 23/126; F25D 2331/81; G01F 23/74
(Continued)

(56) References Cited

U.S. PATENT DOCUMENTS 2,031,283 A 2/1936 Scofield
3,094,154 A 6/1963 Daniels
(Continued)

FOREIGN PATENT DOCUMENTS

DE 102005014741 10/2006
DE 102010026866 A1 1/2011
(Continued)

OTHER PUBLICATIONS

International Search Report for PCT/US2012/070770, dated Feb. 4, 2014, 2 pages.
(Continued)

*Primary Examiner* — Timothy L Maust
*Assistant Examiner* — Timothy P Kelly
(74) *Attorney, Agent, or Firm* — Pearne & Gordon LLP

(57) ABSTRACT

A refrigerator includes a cabinet defining a fresh food compartment and a door pivotally mounted to the cabinet and including an interior surface in communication with the fresh food compartment when the door is closed. A shelf unit is disposed adjacent the interior surface of the door, and a container is supported by the shelf unit. A fill mechanism is positioned vertically above the container and the container is configured to receive liquid from the fill mechanism. A sensor is configured to sense a property of the container or liquid received in the container. A control is in communication with the sensor and regulates a dispensing of liquid into the container based upon the sensed property. The sensor utilizes a magnetic sensing element located adjacent to the container.

12 Claims, 10 Drawing Sheets

Related U.S. Application Data continuation-in-part of application No. 14/740,657, filed on Jun. 16, 2015, now Pat. No. 9,557,097, which is a division of application No. 13/709,525, filed on Dec. 10, 2012, now Pat. No. 9,085,453.

(60) Provisional application No. 61/568,939, filed on Dec. 9, 2011.

(51) Int. Cl.

| | |
|---|---|
| *F25D 23/02* | (2006.01) |
| *G01F 23/74* | (2006.01) |
| *B67D 7/00* | (2010.01) |
| *F25D 23/04* | (2006.01) |
| *F25D 23/12* | (2006.01) |
| *B67D 1/00* | (2006.01) |
| *B67D 1/08* | (2006.01) |

(52) U.S. Cl.
CPC ............. *B67D 1/124* (2013.01); *B67D 7/005* (2013.01); *B67D 7/221* (2013.01); *F25D 23/028* (2013.01); *F25D 23/04* (2013.01); *F25D 23/126* (2013.01); *G01F 23/74* (2013.01); *B67D 2001/1268* (2013.01); *B67D 2210/00036* (2013.01); *F25D 2323/122* (2013.01); *F25D 2331/81* (2013.01); *F25D 2600/02* (2013.01)

(58) Field of Classification Search
USPC .......................................... 141/95, 198, 346
See application file for complete search history.

(56) References Cited

U.S. PATENT DOCUMENTS

| | | | |
|---|---|---|---|
| 3,178,061 A | 4/1965 | Giacalone et al. | |
| 3,366,276 A | 1/1968 | Fridley | |
| 3,678,753 A | 7/1972 | Eggleston et al. | |
| 3,913,401 A | 10/1975 | Sweeney | |
| 4,451,894 A | 5/1984 | Dougherty et al. | |
| 4,712,591 A | 12/1987 | McCann et al. | |
| 4,895,194 A | 1/1990 | McCann et al. | |
| 5,156,021 A | 10/1992 | St-Gelais et al. | |
| 5,490,547 A | 2/1996 | Abadi et al. | |
| 5,542,572 A | 8/1996 | Davis | |
| 5,636,548 A * | 6/1997 | Dunn ...................... G01F 23/72 73/1.73 |
| 5,802,910 A | 9/1998 | Krahn et al. | |
| 5,827,428 A | 10/1998 | Chang | |
| 6,039,219 A | 3/2000 | Bach et al. | |
| 6,148,624 A | 11/2000 | Bishop et al. | |
| 6,574,984 B1 | 6/2003 | McCrea et al. | |
| 6,679,400 B1 | 1/2004 | Goodman | |
| 6,681,585 B1 | 1/2004 | Stagg et al. | |
| 6,708,518 B1 | 3/2004 | Jones et al. | |
| 6,761,067 B1 | 7/2004 | Capano | |
| 6,810,682 B1 | 11/2004 | Schuchart et al. | |
| 6,827,097 B2 | 12/2004 | Goodman | |
| 6,973,803 B2 | 12/2005 | Olive et al. | |
| 7,000,468 B2 | 2/2006 | Doorhy et al. | |
| 7,171,993 B2 | 2/2007 | Bethuy et al. | |
| 7,267,078 B2 | 9/2007 | Palett et al. | |
| 7,438,285 B2 | 10/2008 | Maritan et al. | |
| 7,549,299 B2 | 6/2009 | Kolb Filho et al. | |
| 7,596,964 B2 | 10/2009 | Lim et al. | |
| 7,658,212 B2 | 2/2010 | Meuleners et al. | |
| 7,661,448 B2 | 2/2010 | Kim et al. | |
| 7,673,661 B2 | 3/2010 | Chase et al. | |
| 8,011,203 B1 | 9/2011 | Schenk et al. | |
| 8,109,301 B1 | 2/2012 | Denise | |
| 8,245,735 B2 | 8/2012 | Chase et al. | |
| 8,377,292 B2 | 2/2013 | Patera et al. | |
| 8,434,318 B2 | 5/2013 | Kim | |
| 8,505,593 B1 | 8/2013 | Denise | |
| 8,646,288 B2 | 2/2014 | Lim et al. | |
| 9,010,144 B2 | 4/2015 | Park et al. | |
| 9,085,453 B2 | 7/2015 | McMahan et al. | |
| 9,115,930 B2 | 8/2015 | Park et al. | |
| 9,297,577 B2 | 3/2016 | Anselmino et al. | |
| 9,341,404 B2 | 5/2016 | Lee | |
| 9,487,384 B1 | 11/2016 | Denise | |
| 9,557,097 B2 | 1/2017 | McMahan et al. | |
| 9,618,250 B2 | 4/2017 | Park | |
| 9,663,343 B2 | 5/2017 | Veldhi et al. | |
| 9,890,029 B2 | 2/2018 | Comsa et al. | |
| 2003/0097314 A1 | 5/2003 | Crisp, III et al. | |
| 2003/0145653 A1 | 8/2003 | Kramp | |
| 2004/0182151 A1 | 9/2004 | Meure | |
| 2005/0039420 A1 | 2/2005 | Albritton et al. | |
| 2005/0178273 A1 | 8/2005 | Meuleners et al. | |
| 2005/0268639 A1 | 12/2005 | Hortin et al. | |
| 2006/0207515 A1 | 9/2006 | Palett et al. | |
| 2007/0278141 A1 | 12/2007 | Patera et al. | |
| 2009/0120122 A1 | 5/2009 | Gradl et al. | |
| 2009/0183796 A1 | 7/2009 | Chase et al. | |
| 2009/0258120 A1 | 10/2009 | Zeitler et al. | |
| 2010/0159077 A1 | 6/2010 | Skalski et al. | |
| 2011/0067433 A1 | 3/2011 | An et al. | |
| 2011/0265562 A1 | 11/2011 | Li | |
| 2011/0302935 A1 | 12/2011 | Cur et al. | |
| 2011/0303693 A1 | 12/2011 | Culley et al. | |
| 2012/0111049 A1 | 5/2012 | Kim et al. | |
| 2013/0133352 A1 | 5/2013 | Park et al. | |
| 2013/0133354 A1 | 5/2013 | Park | |
| 2013/0133355 A1 | 5/2013 | Park et al. | |
| 2013/0146179 A1 | 6/2013 | McMahan et al. | |
| 2013/0309361 A1 | 11/2013 | Kyong et al. | |
| 2014/0242219 A1 | 8/2014 | Cho et al. | |
| 2015/0053302 A1 | 2/2015 | Willis et al. | |
| 2015/0197417 A1 | 7/2015 | Stagg et al. | |
| 2015/0329347 A1 | 11/2015 | Veldhi et al. | |
| 2015/0355014 A1 * | 12/2015 | Deak ...................... G01F 23/74 73/313 |
| 2017/0167783 A1 | 6/2017 | Jeong et al. | |
| 2017/0184210 A1 | 6/2017 | Zhong | |

FOREIGN PATENT DOCUMENTS

| | | |
|---|---|---|
| DE | 102013223610 | 7/2015 |
| EP | 0972482 | 1/2000 |
| EP | 2703755 | 3/2014 |
| EP | 3165137 | 5/2017 |
| GB | 2 449 630 A | 3/2008 |
| JP | 0678733 | 3/1994 |
| JP | 06323721 | 11/1994 |
| JP | 07155154 | 6/1995 |
| JP | 2008215716 | 9/2008 |
| TW | M424905 U1 | 3/2012 |
| WO | 2007144011 | 12/2007 |
| WO | 2010057791 | 5/2010 |
| WO | 2017016768 | 2/2017 |

OTHER PUBLICATIONS

International Search Report issued in Application No. PCT/US2012/070770 dated Feb. 4, 2014.

Written Opinion issued in Application No. PCT/US2012/070770 dated Feb. 4, 2014.

* cited by examiner

REFRIGERATOR WITH AUTOMATIC LIQUID DISPENSER

CROSS-REFERENCE TO RELATED APPLICATIONS

This application is a continuation of Ser. No. 15/419,204 filed on Jan. 30, 2017, which was a continuation-in-part of Ser. No. 14/740,657 filed on Jun. 16, 2015, which was a divisional of U.S. application Ser. No. 13/709,525 filed on Dec. 10, 2012, which claims the benefit of U.S. Provisional Patent Application No. 61/568,939, filed Dec. 9, 2011, the entire disclosures of which are hereby incorporated herein by reference.

FIELD OF THE INVENTION

The present application relates generally to a liquid dispenser for an appliance, and more particularly, to an automatic liquid dispenser for an appliance.

BACKGROUND OF THE INVENTION

Appliances, such as refrigerators, are known to include internal and/or external water dispensers. Additionally, appliances are known to include containers for holding water within the appliance.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, a refrigerator comprises a cabinet defining a fresh food compartment and a door pivotally mounted to the cabinet and comprising an interior surface in communication with the fresh food compartment when the door is closed. A liquid dispenser is arranged on the interior surface of the door, and a container is supported on the door and configured to receive liquid from the liquid dispenser. A sensor is configured to sense a property of the container, and a control is in communication with the sensor. The sensor utilizes a magnetic sensing element located adjacent to the container. The control is configured to regulate dispensing of liquid into the container based upon the sensed property of the container.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
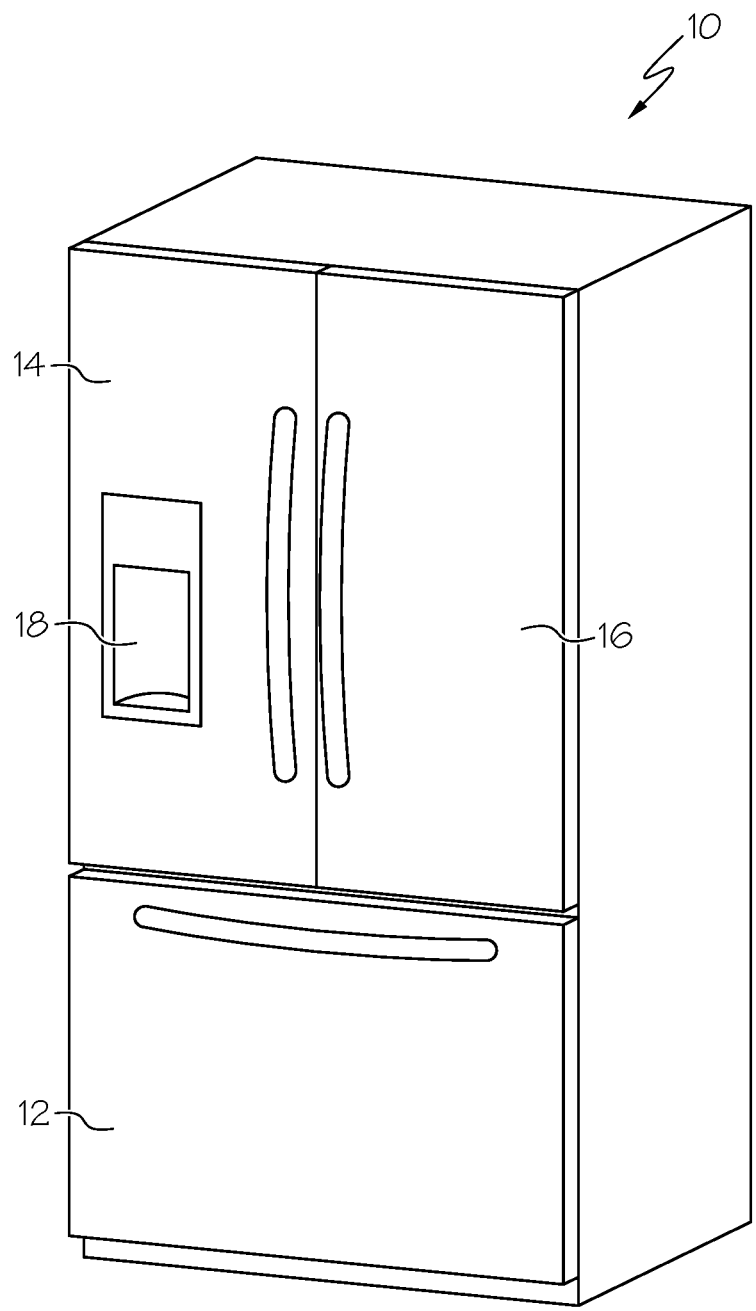
FIG. 1 is a schematic view of an example refrigerator.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Described herein is an apparatus and method for dispensing liquid for filling a water pitcher or carafe automatically within an appliance, such as within a refrigerator compartment. The apparatus is used to supply a user with a full pitcher of liquid when the user opens the refrigerator door. For example, the pitcher can fill automatically when the door shuts. As will be described herein, it is contemplated that the term "full" is intended to mean filled to a predetermined level that may be fixed or alterable. Additionally, although the term "water" is used herein as an example, it is contemplated that apparatus could be used with various other liquids.

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C. and the freezer compartments at temperatures below 0° C.

Turning to the shown example of FIG. 1, a refrigeration appliance is illustrated in the form of a domestic refrigerator, indicated generally at 10. Although the detailed description of an embodiment of the present invention that follows concerns a domestic refrigerator 10, the invention can be embodied by refrigeration appliances other than with a domestic refrigerator 10. Further, an embodiment is described in detail below, and shown in the figures as a "bottom-mount" configuration of a refrigerator 10, including a cabinet defining a fresh-food compartment 14 disposed vertically above a freezer compartment 12. Still, the cabinet can define the fresh-food compartment 14 laterally beside the freezer compartment 12 (i.e., a "side-by-side" refrigerator) or freezer compartment 12 above the fresh-food compartment 14 (i.e., a "top-mount" refrigerator).

One or more doors 16 shown in FIG. 1 are pivotally coupled to a cabinet of the refrigerator 10 to restrict and grant access to the fresh food compartment 14. The door 16 can include a single door that spans the entire lateral distance across the entrance to the fresh food compartment 14 (see FIG. 3), or can include a pair of French-type doors 16 as shown in FIG. 1 that collectively span the entire lateral distance of the entrance to the fresh food compartment 14 to enclose the fresh food compartment 14. For the latter configuration, a center mullion coupled to at least one of the doors 16 to establish a surface against which the doors 16 can seal the entrance to the fresh food compartment 14 at a location between opposing side surfaces of the doors 16.

Conventionally, a dispenser 18 for dispensing at least ice pieces, and optionally water can be provided to one of the doors 16 that restricts access to the fresh food compartment 14 shown in FIG. 1. Generally, the dispenser 18 can include a lever, switch, proximity sensor or other device that a user can interact with to cause frozen ice pieces to be dispensed from an ice bin (not shown) provided to an ice maker (not shown) disposed within the fresh food compartment 14 through the door 16. Ice pieces from the ice bin can be delivered to the dispenser via an ice chute or the like that extends at least partially through the door 16 between the dispenser 18 and the ice bin.

Figure 2:
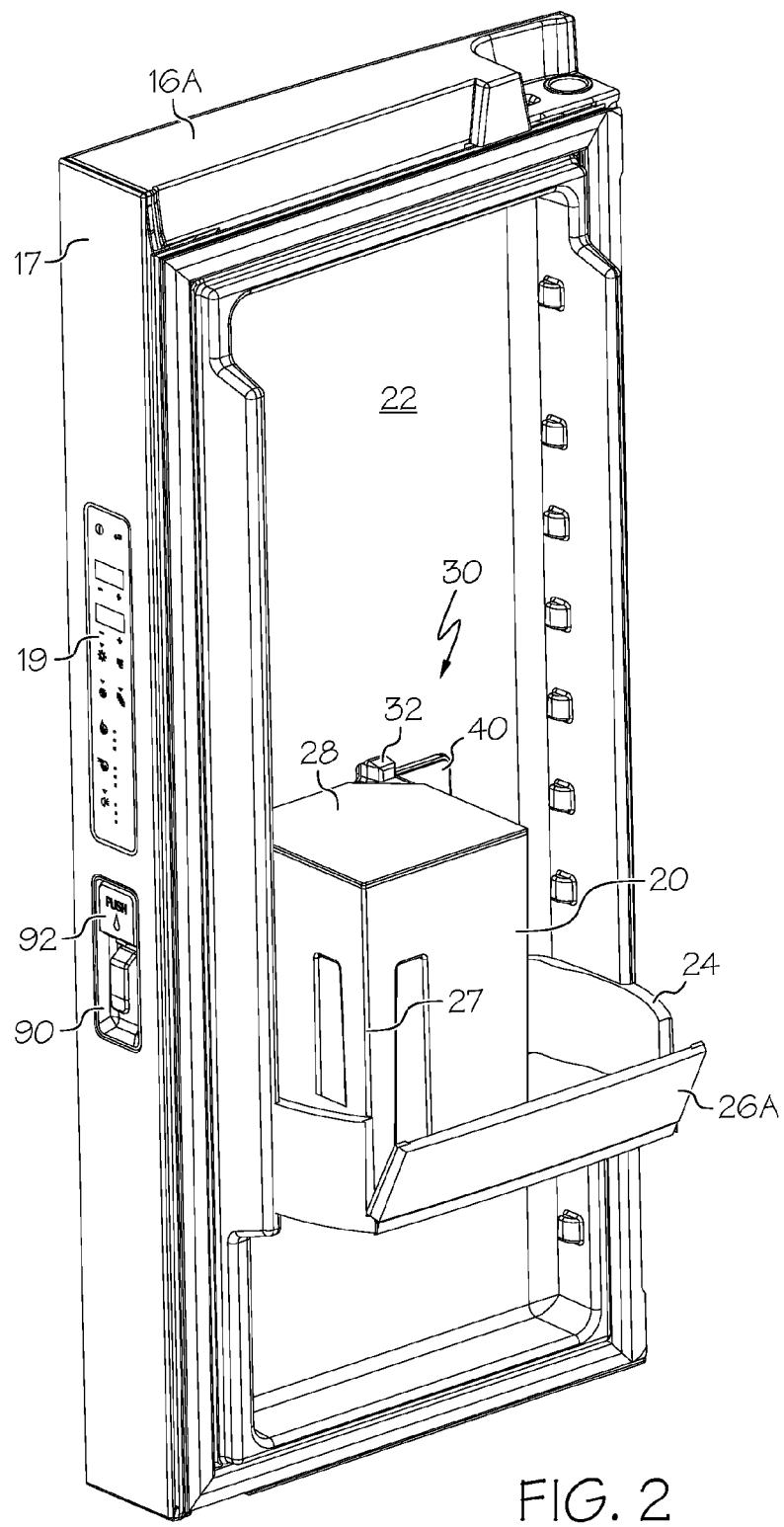
FIG. 2 is a perspective view of one example refrigerator door with an example water pitcher.
Figure 3:
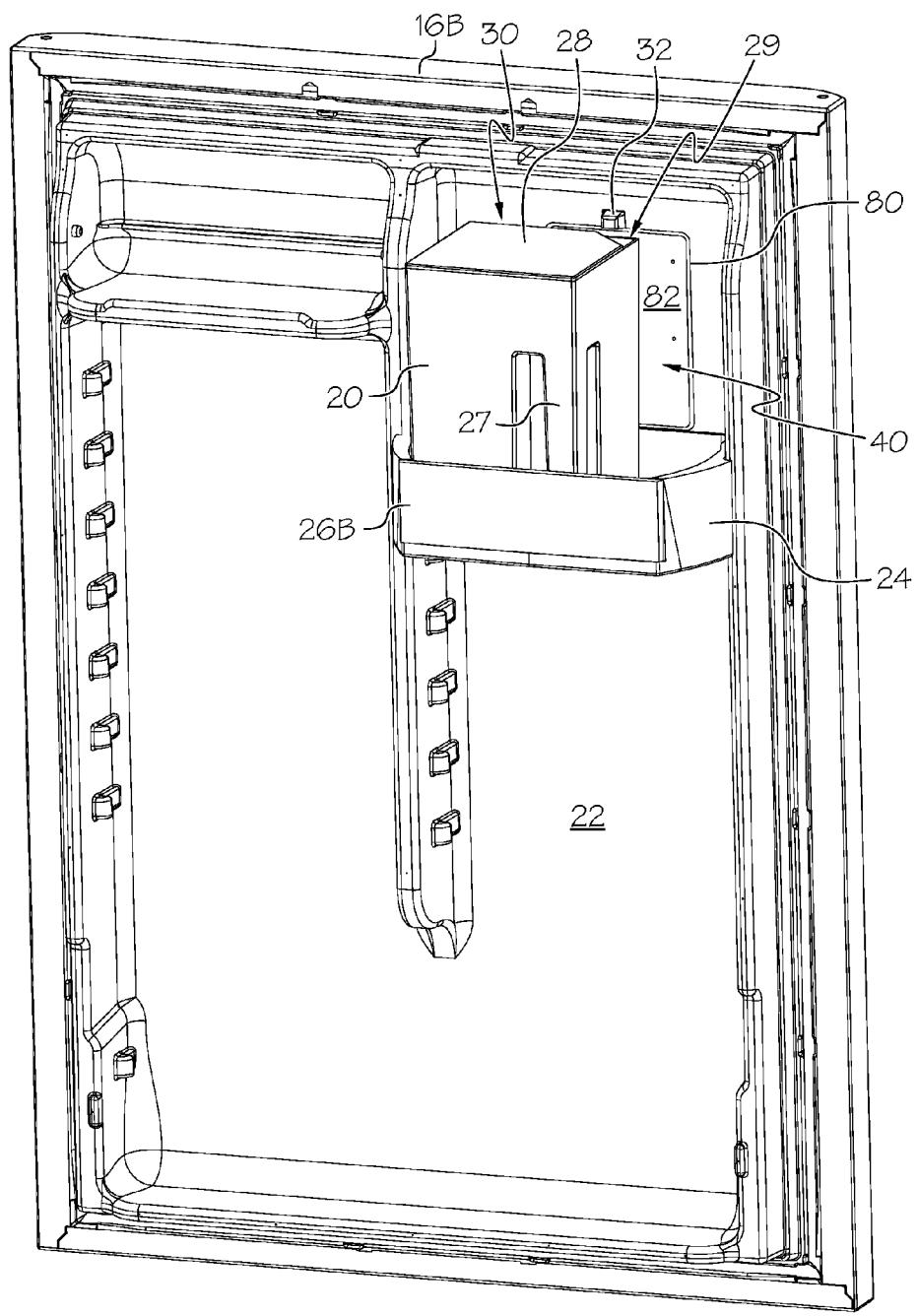
FIG. 3 is a perspective view of another example refrigerator door with an example water pitcher.

However, it is contemplated that the subject application can be used with a refrigerator that does not include a dispenser on a front exterior surface of the door 16 to provide a particular aesthetic look to the refrigerator. Instead, as shown in FIGS. 2-3, the refrigerator 10 can include a container for storing liquid, such as a water pitcher 20 or carafe, located within an interior compartment. Although the term "water pitcher" is used herein as an example, it is contemplated that apparatus could be used with various other containers and liquids. Preferably, the water pitcher 20 is located within the fresh food compartment. The water pitcher 20 can be supported on an interior surface 22 of the refrigerator door 16A, 16B that is in communication with the fresh food compartment 14 when the door 16A, 16B is closed.

As shown in FIG. 2, the refrigerator door 16A can be configured for use as one of a pair of French-type doors, such as for use in a "bottom mount"-style refrigerator. Alternatively, as shown in FIG. 3, the refrigerator door 16B can be configured for use as a single door that spans the entire lateral distance of the entrance to the fresh food compartment, such as for use in a "top mount"-style refrigerator. It is understood that the water pitcher 20 and associated filling structure and methodology discussed herein can be similar, or even different, on the various types of refrigerator doors 16A, 16B.

Each refrigerator door is insulated to minimize the escape of heat from the fresh food compartment 14, and thus have a depth dimension that includes substantially-planar side portions 17 extending at least a part of the way between an exterior face exposed to an ambient environment of the refrigerator 10 and the interior surface 22 that is exposed to an interior of the fresh food compartment 14 while the doors are closed. With reference to the French door configuration 16A of FIGS. 1-2, substantially-planar side portions 17 generally oppose each other when the doors 16A are in their closed positions. A user interface 19 can be at least partially recessed within the side portion 17 of at least one of the doors 16A such that an exterior surface of the user interface 19 is substantially flush with the side portion 17 of the door 16A. When the doors 16A are in their closed positions, the user interface 19 can be substantially hidden from view when the refrigerator 10 is viewed from the front. By substantially hidden from view it is meant that the user interface 19 faces the side portion 17 of the other door, and does not have a noticeable outward appearance, thereby giving the refrigerator 10 a clean look without requiring the user interface 19 to be disposed within the fresh food compartment 14 or freezer compartment 12. Other embodiments include a user interface 19 that is not necessarily flush with the side portion 17, but is recessed into the side portion 17 and set back from the side portion 17. According to other embodiments, the user interface 19 can project outwardly from the side portion 17, but to a lesser extent than the distance separating the side portions of the doors 16A, providing enough clearance to allow the doors 16A to swing closed without contacting each other. In still other embodiments, the user interface 19 can be located within the fresh food compartment 14 and/or freezer compartment 12.

A door bin system can be provided for retaining the water pitcher 20 or carafe within the interior of the refrigerator. For example, the water pitcher 20 can be supported on a movable or non-movable shelf 24. The shelf 24 can have a recessed configuration providing a recess or well to receive and retain the water pitcher 20. In addition or alternatively, the door bin system can include mating structure to assist in properly locating the water pitcher 20 within the door bin system, and/or various retaining or even locking structure to inhibit inadvertent removal of the water pitcher 20, while permitting purposeful removal. The water pitcher 20 can include various geometries, such as square, rectangular, curved, oval, triangular, polygonal, etc. In one example, the water pitcher 20 can have a generally square or rectangular geometry that corresponds generally with the bounded geometry of the shelf 24 and recess so that the water pitcher 20 nests and fits snugly therein.

The support shelf could provide for various methods of removing the water pitcher 20 therefrom, such as vertical removal, front or side lateral removal. The shelf 24 can include a movable (or even removable) front surface 26A (see FIG. 2), such as a pivotable door (or removable panel), to facilitate front or side lateral removal of the water pitcher 20. Front or side removal of the water pitcher 20 may permit an additional refrigerator shelf to be positioned above the water pitcher 20. In addition or alternatively, removal of the water pitcher 20 may deactivate the filling mechanism until the water pitcher 20 is replaced. Alternatively, the shelf 24 can include a non-movable front surface 26B (see FIG. 3), such that the water pitcher 20 is lifted vertically for removal from the shelf 24. The water pitcher 20 can include various other features, such as one or more handles 27 configured to be grasped by a user. The water pitcher 20 can further include a removable or non-removable top cover 28 or lid that can include an opening or pour spout 29 to permit a user to pour water into a glass or other vessel, and/or the pour spout may further provide an opening allow water ingress during filling.

The automatic liquid fill mechanism can be located variously within the refrigerator. In addition or alternatively, the fill mechanism can be located as part of a shelf unit, drawer unit, and/or icemaker. In addition or alternatively, the fill mechanism can be located on the inside of the refrigerator door. For example, the refrigerator 10 can further include a liquid dispenser 30 arranged on the interior surface 22 of the door 16A, 16B. The liquid dispenser 30 receives liquid, such as water, from an inlet water supply, and dispenses the liquid via a spout 32 into the water pitcher 20. Preferably, the spout 32 is located on the refrigerator door, although it is contemplated that the spout 32 could be located variously within the fresh food compartment, such as on a sidewall, ceiling, or floor of the liner. At least one actuator 34 (illustrated schematically, see FIG. 6A), such as an electromechanical valve, is disposed in fluid communication between the inlet water supply and the liquid dispenser 30 and is configured to selectively permit dispensing of the liquid via the spout 32. Optionally, a water filter (not shown) can be provided to the refrigeration appliance 10 to minimize impurities in fresh water to be dispensed.

The refrigerator 10 further includes a sensor 40 configured to sense a property of the water pitcher 20, and an electrically operated control 50 in communication with the sensor 40 configured to regulate the dispensing of liquid into the water pitcher 20 based upon the sensed property of the water pitcher 20. For example, the actuator 34 can be electrically actuated and operated (e.g., opened and closed) by the control 50 to selectively permit dispensing of the liquid via the spout 32. Additionally, the actuator 34 can be opened or closed to a varying degree to control the water flow rate therethrough for relatively faster or slower filling of the water pitcher 20, which could be controlled by the control 50 based upon sensor feedback during the filling process. Although the control 50 is illustrated adjacent to the water pitcher 20, it is contemplated that the control 50 could also be part of the main control circuitry of the refrigerator 10 and/or operated via the user interface 19. The control 50 may inhibit or permit operation of the actuator 34 and filling the water pitcher 20 while the refrigerator door 16A, 16B is in an open condition.

In one example, the property sensed by the sensor 40 is a presence of the water pitcher 20 adjacent to the liquid dispenser. Thus, the sensor 40 can detect whether the water pitcher 20 is retained on the shelf 24, or conversely the absence of the water pitcher 20. The sensor 40 could also be configured to sense the type or size of the water pitcher, and could adjust the filling and/or sensing parameters based upon the sensed type or size. In addition or alternatively, the property sensed by the sensor 40 is an amount of liquid within the water pitcher 20. Thus, the sensor 40 can detect the amount of liquid contained (e.g., fill level), such as a plurality of different amounts of liquid within the water pitcher 20. As will be described herein, the sensing structure and methods can directly or indirectly be used to control the automatic filling process.

The sensor 40 can utilize various sensing methods and structures for automatically sensing the presence and/or the amount of liquid within the water pitcher 20. In various examples, the sensing structure could utilize an infrared-sensing control system, an optical-sensing control system, a pressure and/or weight-sensing control system, a magnetic and/or electrical proximity sensing control system, electric field (E-field) sensing, inductive sensing, resistive sensing, temperature sensing control system, water flow sensing control system, electrical conductivity sensing control system, mechanical and/or electromechanical float switch sensing control system, and/or various other sensing systems capable of determining the presence and/or the amount of liquid within the water pitcher 20. In addition or alternatively, the sensor 40 can utilizes sound waves, such as via sonar or ultrasonic sound waves. In addition or alternatively, the sensor 40 can utilize an electrically conductive-path within the liquid in the water pitcher 20. For example, the sensor 40 can utilize the liquid contained within the water pitcher 20 to establish an electrically conductive path or circuit among two or more electrodes, such as a plurality in an array or the like.

Figure 5:
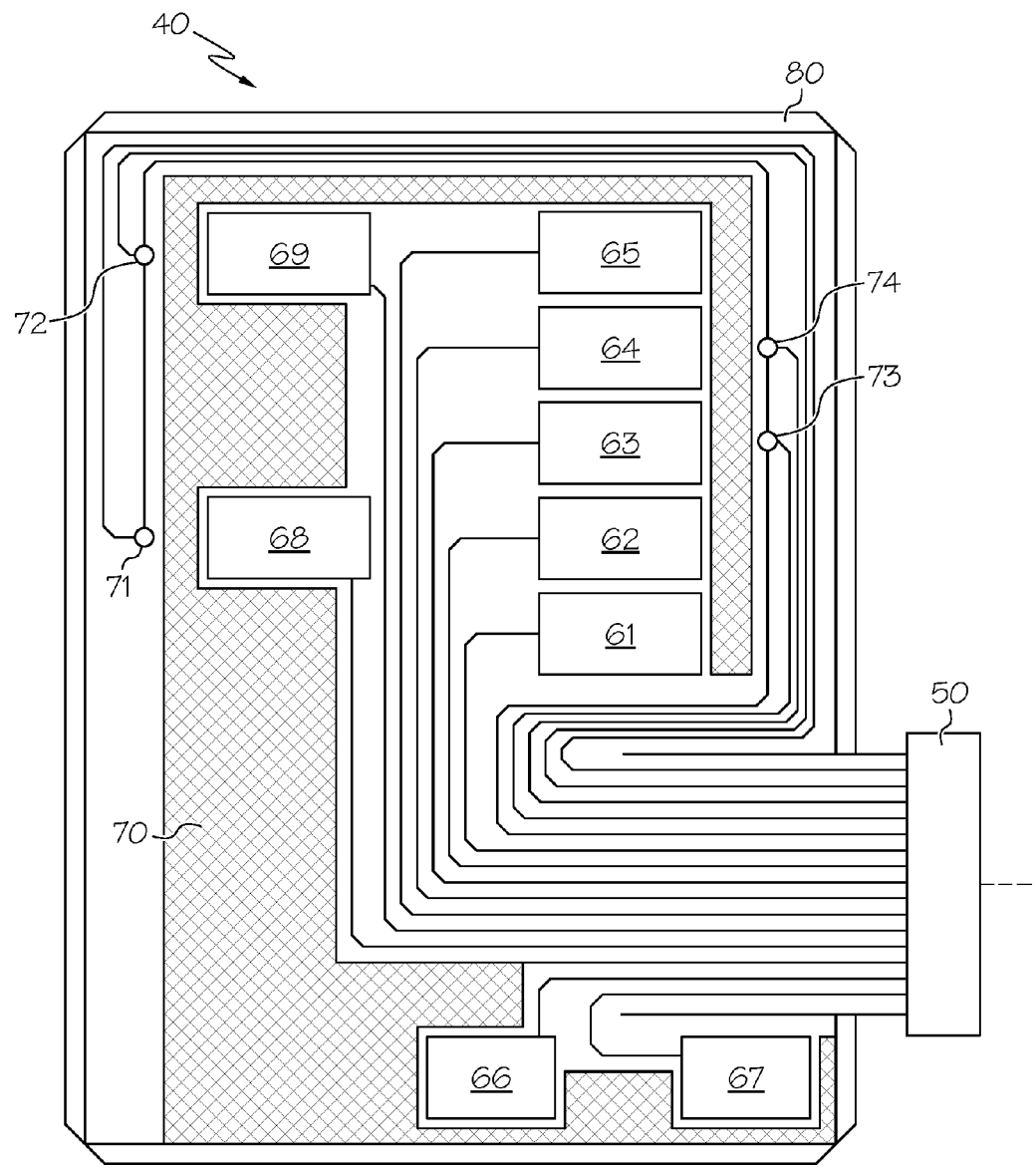
FIG. 5 is a schematic view of an example sensing circuit according to one embodiment.

In addition or alternatively, according to an embodiment, the sensor 40 can utilize a capacitive sensor. Turning to FIG. 5, the sensor 40 is illustrated as a capacitive sensor. For example, the sensor 40 can include a plurality of capacitive sensors 61-69 configured to sense the presence and/or the amount of liquid within the water pitcher 20. Any or all of the capacitive sensors 61-69 may utilize a ground plane, such as a common ground plane 70 to determine an amount or change in capacitance. Additionally, any or all of the capacitive sensors 61-69 may be electrically coupled to the control 50 via wires, printed circuits, flex cables, or the like. While the sensor 40 will be described with reference to a capacitive sensor design, it is understood that the description can apply to any of the other types of sensors discussed herein.

A plurality of capacitive sensors 61-65 can be configured to sense a plurality of different amounts of liquid within the water pitcher 20. In one example, the plurality of capacitive sensors 61-65 are arranged in an array positioned to extend along a length of the water pitcher 20. As shown, the plurality of capacitive sensors 61-65 can be arranged in a vertical array positioned to extend along at least a portion of the vertical length of the water pitcher 20 when the water pitcher 20 is located adjacent to the sensor 40. It is contemplated that the outermost capacitive sensors 61 and 65 may correspond to the minimum and maximum amount of liquid capable of being contained within the water pitcher 20, respectively, so that the control 50 can determine the actual amount of liquid contained within the water pitcher 20 based upon input from the capacitive sensors 61-65. Alternatively, at least one of the outermost capacitive sensors 61-65 may correspond to an amount of liquid or may correspond to amounts more or less than the minimum and maximum, so that the control 50 can determine the estimated amount of liquid contained within the water pitcher 20 based upon input from the capacitive sensors 61-65 as well as additional information, such as predetermined information about the water pitcher 20. For example, FIG. 6B illustrates that the water pitcher 20 extends into the recess below the example location of the first capacitive sensor 61. In the shown example, the control 50 can determine at least five amounts of liquid contained within the water pitcher 20 via the sensed values of the five capacitive sensors 61-65. The control 50 may also be configured to determine more than five amounts of liquid based utilizing multiple sensed values from two or more of the capacitive sensors 61-65 to achieve a greater resolution. In addition or alternatively, the control 50 may also be configured to determine the fill rate of the water pitcher 20, such as during a filling operation, based upon a rate of change of sensed values from the capacitive sensors 61-65.

In addition or alternatively, one or more capacitive sensors 66-67 can be configured to sense presence of the water pitcher 20 adjacent to the liquid dispenser. For example, a pair of capacitive sensors 66-67 can be located variously on the sensor 40, such as towards the bottom, to sense whether the water pitcher 20 is located adjacent to the sensor 40. Although it is possible to use only a single capacitive sensor, the use of a plurality of capacitive sensors can inhibit a false-positive reading, especially if a container other than the water pitcher 20 is placed on the shelf 24. For example, the plurality of capacitive sensors 66-67 can be located on the sensor 40 in a spaced-apart relationship so as to correspond generally to the geometry of the water pitcher 20. It is contemplated, however, that one or more of the level-sensors 61-65 could also be used to sense presence of the water pitcher 20 adjacent to the liquid dispenser. Additionally, the plurality of capacitive sensors 66-67 (and/or others of the sensors 61-65 or 68-69) could be used to determine a type or size of the water pitcher 20 to be filled.

In addition or alternatively, the refrigerator 10 can further include a user input configured to select one of a plurality of different fill amounts of liquid within the water pitcher 20. Thus, a user can have a "full" water pitcher that is filled to a predetermined level that may be fixed or alterable. A user can have the water pitcher 20 automatically filled to a predetermined level, such as 50%, 75%, 100%, or other amount of the total available volume of the water pitcher 20. For example, one user may wish to have the water pitcher 20 automatically filled to about 100% to have the maximum amount of chilled water available. However, another user, such as a young or elderly user, may wish to only have the water pitcher 20 automatically filled to about 50% of the total available volume to thereby reduce the weight of the water pitcher 20 so that it is easier to remove from the shelf 24. One or more capacitive sensors 68-69 can be configured as the user input to enable the user to select one of the desired fill amounts of liquid within the water pitcher 20. The location of the capacitive sensors 68-69 can be adjacent to the actual liquid level contained within the water pitcher 20 when it is located on the shelf 24. Thus, a user can intuitively touch an area on the sensor 40 adjacent to the water pitcher 20 that corresponds to the amount of liquid fill level desired. Alternatively, the user input can include other types of switches, such as a membrane switch, push-button switch, computer-generated capacitive soft keys displayed by a LCD, OLED or other type of display, tactile buttons, multi-position switches, knobs, or any other input device that is operable to input a user selection, and/or can even be selected as part of the user interface 19 of the refrigerator 10. Upon selecting a desired fill level, the control 50 can operate the actuator 34 to permit the water pitcher 20 to be filled via the spout 32 until the desired amount of water (i.e., a predetermined "full" water pitcher amount) is sensed within the water pitcher 20.

Further, a feedback system can be configured to indicate at least one of a current amount of liquid in the water pitcher 20 and a selected amount of liquid in the water pitcher 20. For example, the feedback system can include at least one visual indicator, and preferably a plurality of visual indicators 71-72. The visual indicators 71-72 can be lights, such as LED lights or the like, that can be positioned adjacent to or part of the user input capacitive sensors 68-69 or switches used to select the desired fill level. For example, the indicators 71-72 can illuminate in response to the user actuating the capacitive sensors 68-69. In addition or alternatively, other visual indicators (not shown) can be located adjacent the indicators 71-72 or even the level-sensing capacitive sensors 61-65 to visually indicate the current amount of liquid in the water pitcher 20. Other types of feedback systems can be used, such as sound feedback and/or tactile feedback (e.g., vibration, etc.). In addition or alternatively, the indicators 71-72 can blink when the water pitcher 20 is sensed to be absent from the shelf 24, and can stay illuminated based once the water pitcher 20 is sensed as being docked onto the shelf 24 adjacent the sensor 40.

In addition or alternatively, another feedback system can be configured to indicate a stale liquid condition when the water pitcher 20 has not been removed from the door after a predetermined amount of time has elapsed. Liquid contained in the water pitcher 20, such as water, can become stale, undesirable, and/or unsanitary if the water pitcher 20 is not removed from the shelf 24 and used for a long period of time. Thus, the feedback system can monitor the amount of time the water pitcher 20 is on the shelf 24 without being removed, and alert the user after a predetermined amount of time has elapsed. The predetermined amount of time could be preset, or could even be adjustable by the user via the user interface 19 or other user input. The predetermined amount of time could be a few days, a week, two weeks, or other value generally related to an amount of time for the water to become stale, undesirable, and/or unsanitary. The feedback system can include at least one visual indicator, and preferably a plurality of visual indicators 73-74. The visual indicators 73-74 can be lights, such as LED lights or the like, positioned to be easily observable by a user when the water pitcher 20 is retained on the shelf 24. One light 73 can be used to indicate a stale water condition, and can be illuminated in an appropriate red or orange color. The other light 74 can be used to indicate an acceptable water condition, and can be illuminated in an appropriate green or blue color. Of course, various other colors can be used, and/or a single light or LED capable of emitting multiple colors could also be used. Other types of feedback systems can be used, such as sound feedback and/or tactile feedback (e.g., vibration, etc.). It is further contemplated that the indicator could be part of the user interface 19. In addition or alternatively, the indicators 73-74 can blink when the water pitcher 20 is sensed to be absent from the shelf 24, and can stay illuminated based once the water pitcher 20 is sensed as being docked onto the shelf 24 adjacent the sensor 40.

Figure 4:
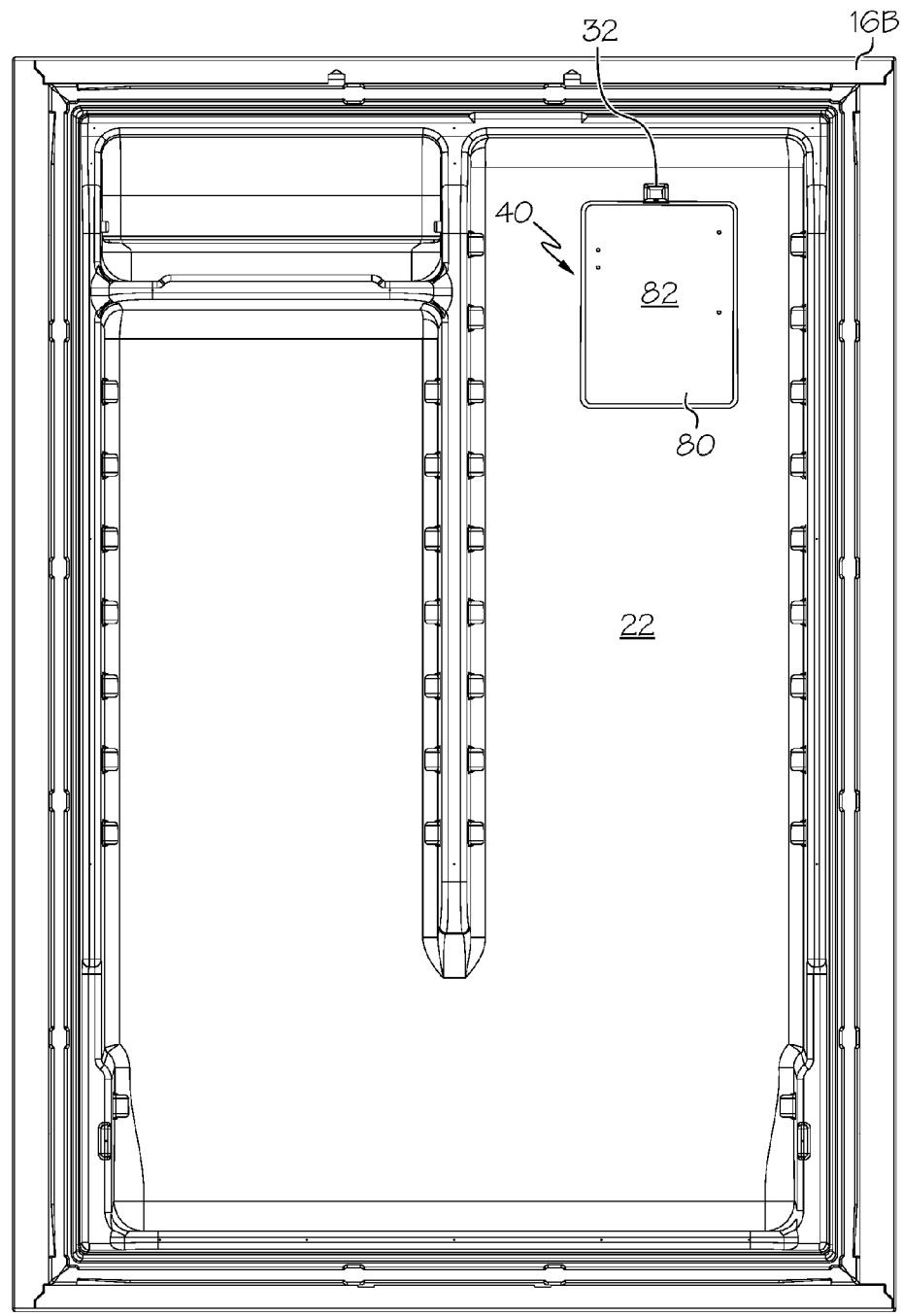
FIG. 4 is a front view of the refrigerator door of FIG. 3 without the water pitcher.

The capacitive sensors 61-69 can be coupled to a dielectric plate 80 located adjacent to the water pitcher 20. Some or all of the dielectric plate 80, capacitive sensors 61-69, control 50 and electrical connections, spout 32, actuator 34, and/or associated water lines can be foamed-into the refrigerator door during the manufacturing of the refrigerator. Alternatively, some of these elements may be attached to internal mounting structure after the refrigerator door liner and/or insulating foam has been installed. The dielectric plate 80 can be formed of various materials that generally will not interfere with the operation of the capacitive sensors 61-69 (or other types of sensors). The dielectric plate 80 can have a geometry corresponding to the geometry of the water pitcher 20. For example, the dielectric plate 80 can have a generally planar geometry with a face 82 (see FIG. 4) configured to engage an external side wall of the water pitcher 20. Still, the geometry of the dielectric plate 80 can closely correlate to the external geometry of the water pitcher 20 adjacent thereto so that the dielectric plate 80 mates closely with the water pitcher 20. It is contemplated that the geometry of the dielectric plate 80 could closely correlate but not touch the external geometry of the water pitcher 20 so as to provide a desired air gap therebetween. The face 82 of the dielectric plate 80 can be made of a material and/or have surface features that are compatible with the external side wall of the water pitcher 20, so as not to cause damage or scratching of the water pitcher 20 via contact. The face 82 may also have cutouts for the indicators 71-74 or be light transmissible so that the indicator lights can be viewed therethrough. It is appreciated that the sensor 40 shown in FIG. 5 is illustrated without the face 82 of the dielectric plate 80 for clarity of the underlying capacitive sensors 61-69.

Additionally, the dielectric plate 80 can be biased towards the water pitcher 20. Generally, capacitive sensor performance is increased when located relatively close to the item to be sensed. In one example, the dielectric plate 80 can be resiliently biased close to the water pitcher 20 to reduce an air gap therebetween. Preferably, the dielectric plate 80 is resiliently biased into engagement with the water pitcher 20 so that there is little or no air gap between the exterior surface of the water pitcher 20 and the face 82 of the dielectric plate 80. While some air gap(s) may exist, it is beneficial to have little or no air gap between the exterior surface of the water pitcher 20 and the areas of the dielectric plate 80 with the capacitive sensors 61-69. The dielectric plate 80 can be biased in various manners, such as via one or more springs 84 or the like. Multiple springs 84 can be utilized to permit the dielectric plate 80 to move relative to the door 16B at various angles, so as to facilitate insertion or removal of the water pitcher 20 and/or contact of the dielectric plate 80 with the water pitcher 20. Various configurations are contemplated. For example, two springs 84 can be provided at the top and bottom, or on either side, or even four springs 84 could be provided at the corners or one on each side.

Figure 6A:
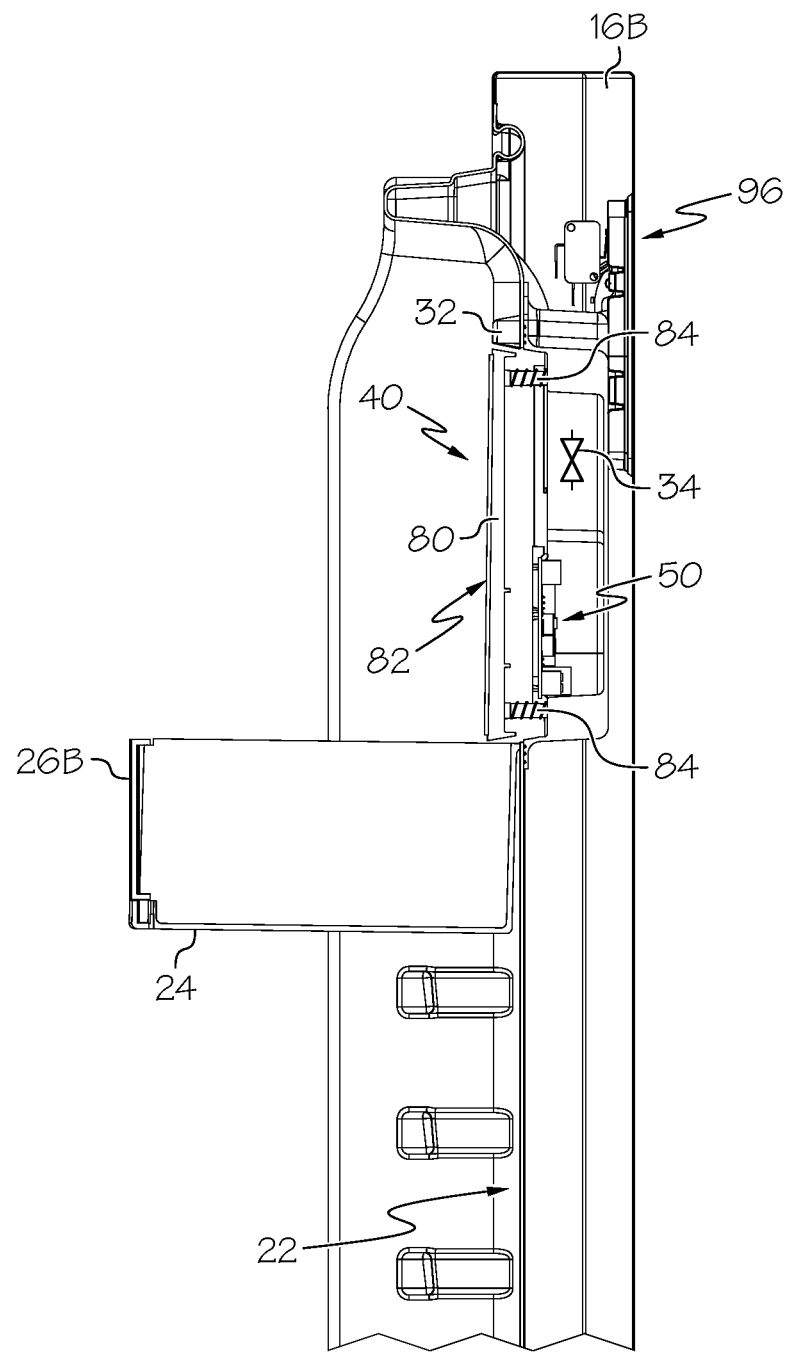
FIG. 6A is a side view of the refrigerator door and sensing circuit without the water pitcher.
Figure 6B:
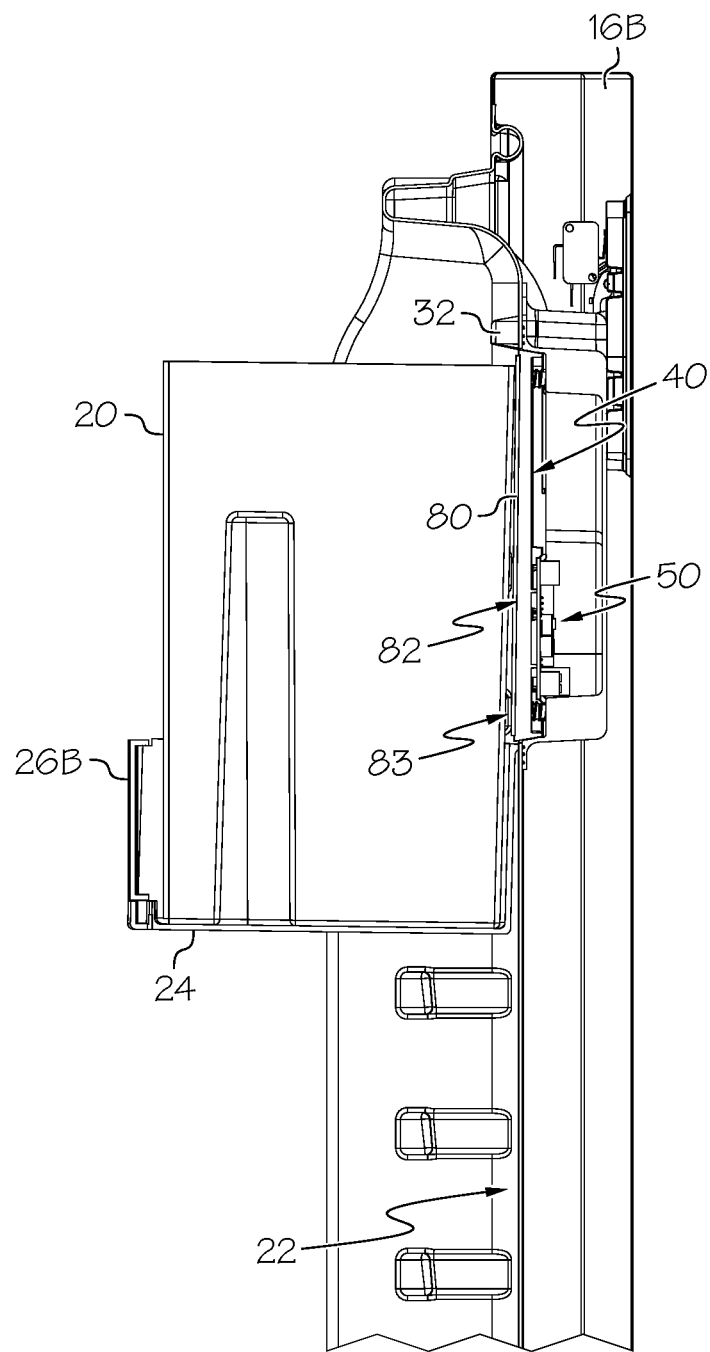
FIG. 6B is similar to FIG. 6A, but includes the water pitcher.
Figure 7:
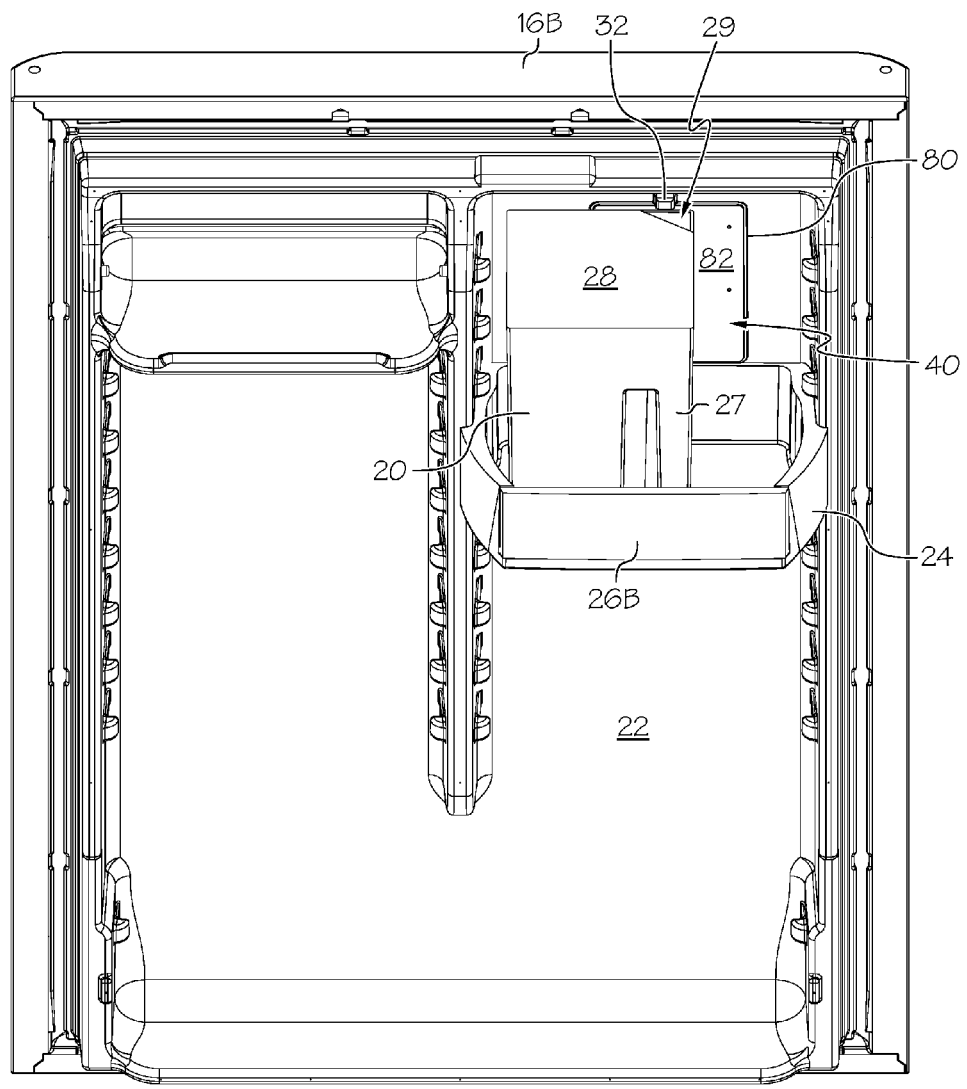
FIG. 7 is a top perspective view of the refrigerator door and water pitcher of FIG. 3.

Turning to FIG. 6A, the water pitcher 20 is shown removed from the shelf 24. The dielectric plate 80 is biased away and spaced a distance apart from the interior surface 22 of the door 16B by the springs 84. Next, turning to FIG. 6B, the water pitcher 20 is shown inserted into the recess or well of the shelf 24. The water pitcher 20 is nestled snugly between front surface 26B of the shelf and the biased dielectric plate 80, which compresses the springs 84. The dielectric plate 80 is now moved and towards the interior surface 22 of the door 16B, and is in engagement with the external surface of the water pitcher 20. Thus, the action of inserting the water pitcher 20 onto the shelf 24 compresses the springs 84 to bias the face 82 of the dielectric plate 80 against the water pitcher 20. It is further contemplated that the filling mechanism could be disabled until the dielectric plate 80 is now moved and towards the interior surface 22, such as determined via any of the capacitive sensors 61-69, or a switch or the like (not shown). In addition or alternatively, the exterior surface of the water pitcher 20 can include one or more projections 83 configured to engage the face 82 of the dielectric plate 80 to facilitate movement thereof and/or provide orientation based upon sloping or other geometry of the water pitcher 20 that may or may not match that of the face 82. In addition or alternatively, the dielectric plate 80 can include one or more mechanical stops on the rear side thereof so as to limit and/or orient the dielectric plate 80 when it is compressed by the water pitcher 20.

Figure 8:
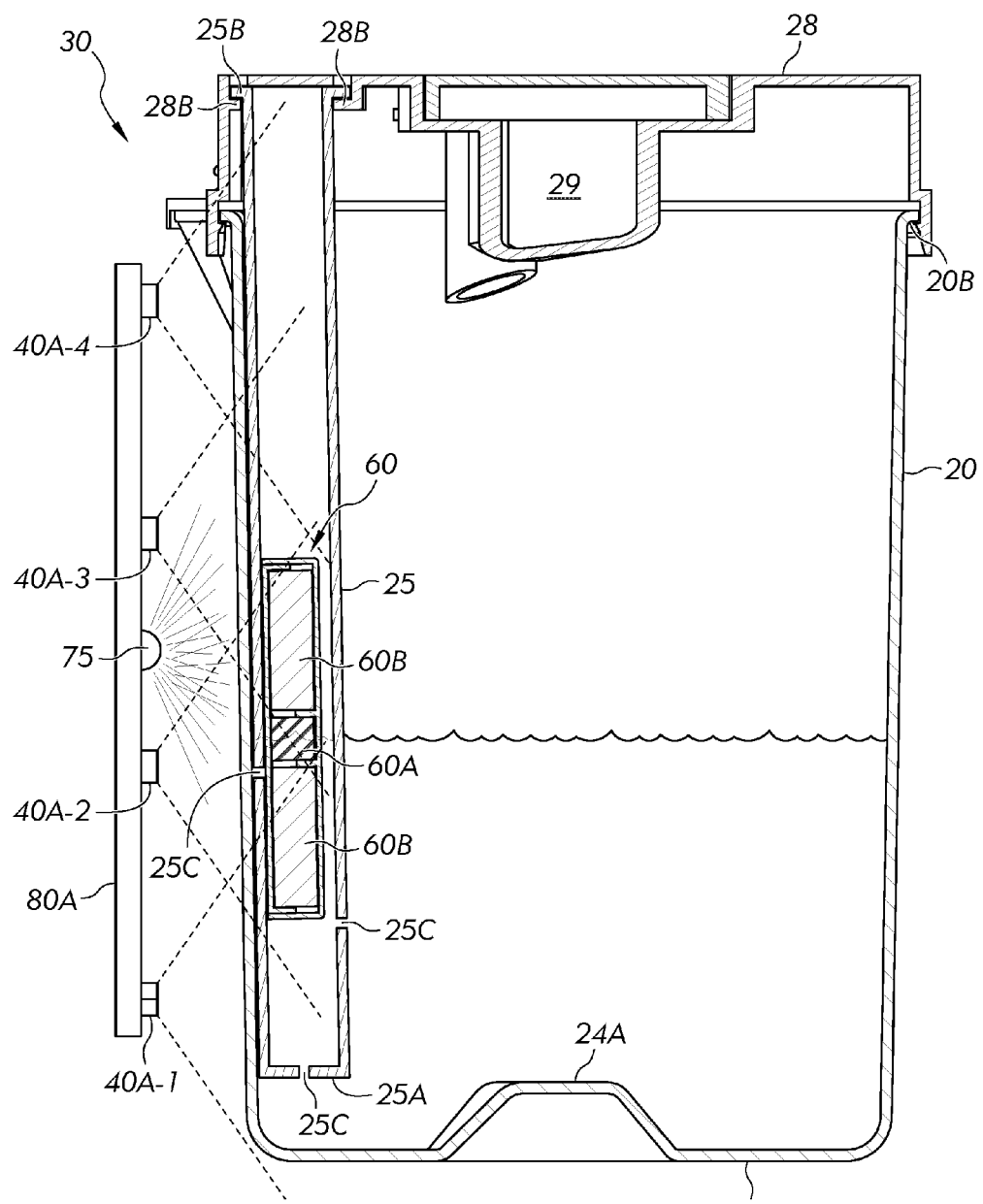
FIG. 8 is a schematic side view of a sensing circuit and water pitcher according to a further embodiment.

According to a further embodiment, the sensor 40 can utilize a magnetic sensor. Turning to FIG. 8, the sensor 40 can include a magnetic body that is detectable by a magnetic sensing element. For example, the magnetic body can be a float assembly 60 comprising a magnetic element 60A. The float assembly 60 can be contained within an auxiliary column 25 within the water pitcher 20. The auxiliary column 25 may be permeable to water or other fluids, so that, at any given time, the water level within the auxiliary column 25 may be substantially the same as the water level in the water pitcher 20. When the water level within the water pitcher 20 changes, the level of the float assembly 60 may change to match the water level within the water pitcher 20. Furthermore, the magnetic sensing element can be one or more magnet detection sensors 40A-1, 40A-2, 40A-3 and 40A-4 configured to periodically or continuously sense the location of float assembly 60. In particular, the magnet detection sensors 40A-1 to 40A-4 may analyze the strength of the detected magnetic field of the magnetic element 60A and thus provide periodic or continuous indications of the presence and/or the amount of liquid within the water pitcher 20. Any or all of the magnet detection sensors 40A-1 to 40A-4 may be electrically coupled to the control 50 via wires or wireless connections, printed circuits, flex cables, or the like.

At least one magnet detection sensor, such as a plurality of magnet detection sensors 40A-1, 40A-2, 40A-3 and 40A-4, can be configured to sense an amount of liquid within the water pitcher 20. Each one of the magnet detection sensors 40A-1 to 40A-4 can be implemented, for example, as a tunneling magnetoresistance sensor, and may be of analog or digital type. Tunneling magnetoresistance sensors are known to provide a variable resistance, based on the proximity of a magnetic field. Magnetoresistance sensors function by producing a variable resistance value where the resistance varies according to the strength of the sensed magnetic field. If an analog type sensor is used, the variable resistance value can then be converted to a digital value, i.e., by an analog-to-digital (ADC) converter, for example a digital value on a scale from 0 to 4096 units or other range to achieve a desired precision (i.e, 0-1024, 0-2048, etc.). Where a digital type sensor is used, the output can be a direct digital value, such as 0 to 4096 units or other range. According to this scheme, if one of the magnetoresistance sensors outputs 0, that means that no magnetic field in the vicinity of the sensor can be sensed. A value of 4096, on the other hand, would indicate the strongest magnetic field that can be sensed, such as the magnetic field that would result from a magnet of at least a certain strength being held directly next to (or even on) the sensor. For example, a maximum value may occur when the magnet is located substantially perpendicular to the sensor. Values between the minimum and maximum (i.e., a value of 1000, 2000, 3000, etc.) can be used to understand a relative distance between the sensor and the magnet, such as where the magnet is located at some non-perpendicular angle to the sensor. Preferably, in the above description, the polar orientation (i.e., north/south) is arranged perpendicular to the sensor (for example, as shown in FIG. 8, the south pole of the magnet would be arranged closest to the sensors).

In one example, the plurality of magnet detection sensors 40A-1 to 40A-4 are arranged in an array positioned to extend along at least a portion of a vertical length of the water pitcher 20. As shown, said plurality of magnet detection sensors 40A-1 to 40A-4 can be arranged on a backplate 80A. The plurality of magnet detection sensors 40A-1, 40A-2, 40A-3 and to 40A-4 can be arranged in a vertical array positioned to extend along at least a portion of the vertical length of the water pitcher 20 when the water pitcher 20 is located adjacent to the sensor 40. Alternatively or in addition, the plurality of magnet detection sensors 40A-1 to 40A-4 can be arranged in a vertical array positioned to extend along at least a portion of the vertical length of the auxiliary column 25 when the water pitcher 20 is located adjacent to the sensor 40.

Each one of the magnet detection sensors 40A-1 to 40A-4 may be adapted to detect a relative position of the float assembly 60 in a vicinity of the respective magnet detection sensor 40A-1, 40A-2, 40A-3 or 40A-4. More particularly, each magnet detection sensor 40A-1 to 40A-4 has a corresponding detection zone, indicated by dashed lines in one example shown in FIG. 8. Within each sensor's detection zone, a value sensed by the respective sensor will be non-zero when the magnetic element 60A is located within that detection zone. At any given time, the magnetic element 60A contained within float assembly 60 will preferably be within range of at least one sensor. Preferably, the magnetic element 60A contained within float assembly 60 will preferably be within range of at least two sensors. However, at the same time, other sensors can be out of range and not detect the float assembly 60. In the instantaneous configuration shown in FIG. 8, the magnetic element 60A is within range of sensors 40A-2 and 40A-3, but out of range of 40A-4. Furthermore, in the configuration shown, the magnetic element 60A is almost or just barely within range of sensor 40A-1. According to one example, the sensors should preferably be arranged such that the magnetic element 60A falls within the detection zone of two of the magnet detection sensors 40A-1, 40A-2, 40A-3 and 40A-4 at any given time. However, an arrangement whereby the magnetic element 60A falls within the detection zone of only one sensor, or more than two sensors, is also contemplated. In this respect, it is noted that different sensors may, due to their construction and/or design, have different detection zones with varying shapes or sizes, resulting in different ranges of the respective sensors. Therefore, when deciding on placement of magnet detection sensors 40A-1 to 40A-4, it can be advantageous to consider the extent or range of the detection zone of each sensor.

The control 50 can be programmed to quickly determine the actual amount of liquid as well as a change (e.g., amount of change or rate of change) in the amount of liquid contained within the water pitcher 20 based on two or more inputs from respective magnet detection sensors 40A-1, to 40A-4 which are located closest to the actual position of the float assembly 60. As shown in FIG. 8, one or more of the magnet detection sensors 40A-1, to 40A-4 will be relatively closer (in distance) to the float assembly 60. Because magnetic field strength is a function of distance, each magnet detection sensor 40A-1 to 40A-4 will detect a relatively greater or lesser magnetic field strength from the float assembly 60. In other words, based on the relative strength of the magnetic field of the float assembly 60 that is detected by each of the individual magnet detection sensors 40A-1 to 40A-4, the control 50 can quickly determine the estimated amount of liquid contained within the water pitcher 20 with a high degree of accuracy and granularity (i.e., a highly degree of detail). Furthermore, the change in the amount of liquid can be determined by the control 50, by finding which two sensors produce the strongest signals, and whether the detected values of the respective two sensors are increasing or decreasing. From this, the control 50 can determine whether the level of the magnetic float assembly 60, corresponding to the water level, is rising or falling. In other words, by watching the direction of movement of sensed values through the detection zones, it can be determined whether the pitcher 20 is filling or draining. For example, as shown in FIG. 8, if the water level is rising (and with it float assembly 60 is also rising) then it is expected that the signal of sensor 40A-2 will decrease (i.e., as the magnetic element 60A moves away) while the signal of sensor 40A-3 will increase over time (i.e., as the magnetic element 60A move closer). Such a determination of liquid level can be made in various ways, such as by a comparison of the detected magnetic field strengths, and/or by a mathematical algorithm based on or utilizing the detected magnetic field strengths, by a look-up table, etc. It is contemplated that the control can operate some or all of the magnet detection sensors 40A-1 to 40A-4 individually, simultaneously, sequentially, in patterns, etc.

It is contemplated that the outermost magnet detection sensors 40A-1 and 40A-4 may correspond to the minimum and maximum amount of liquid desired to be (or capable of being) contained within the water pitcher 20, respectively, so that the control 50 can determine the actual amount of liquid contained within the water pitcher 20 based upon input from the outermost magnet detection sensors 40A-1 and 40A-4. Alternatively, the positioning of at least one of the outermost magnet detection sensors 40A-1 and 40A-4 may correspond to an amount of liquid more or less than the minimum and maximum, respectively. In other words, the bounds of the sensed liquid may be within the bounds of liquid that it may physically be possible to store in the pitcher 20. According to one example, when the water level is at a minimum, only the lowermost magnet detection sensor 40A-1 will detect the float assembly 60. Similarly, when the water level is at a maximum, only the uppermost magnet detection sensor 40A-4 will detect the float assembly 60. All other sensors, in particular the middle sensors 40A-2, 40A-3, will read minimal or zero. It is understood that FIG. 8 is intended to be a schematic illustration, and that the various sizes, shapes, and relationships of the elements may change to accommodate the desired sensor operation.

For example, FIG. 8 illustrates that the water pitcher 20 is placed such that its base 20A (i.e., bottom surface) is below the example location of the first magnet detection sensor 40A-1. Furthermore, the water pitcher 20 is placed such that a base 25A (i.e., bottom surface) of the auxiliary column 25 is below the example location of the first magnet detection sensor 40A-1. In the example shown, the control 50 can determine the amount of liquid contained within the water pitcher 20 via the sensed values of the four magnet detection sensors 40A-1 to 40A-4. The control 50 may also be configured to utilize fewer or more sensed values from one, two, three, five or more magnet detection sensors to achieve a desired accuracy. In addition or alternatively, the control 50 may also be configured to determine the fill rate of the water pitcher 20, such as during a filling operation, based upon a rate of change of sensed values from the magnet detection sensors 40A-1 to 40A-4.

The water pitcher 20 may contain an auxiliary column 25 to enclose a float assembly 60 and ensure a suitable proximity between magnet detection sensors 40A and float assembly 60. Auxiliary column 25 may be provided in the form of a tube extending vertically along all or part of the length of the water pitcher 20. A cross-section of the tube may have various geometries, such as square, rectangular, curved, oval, triangular, polygonal, etc. In one example, the auxiliary column 25 can have sidewalls with a generally circular cross-section, that generally corresponds to a geometry of the float assembly 60. In other words, the float assembly 60 can fit within the auxiliary column 25, with enough leeway to allow the float assembly 60 move freely in an upward or downward direction within the auxiliary column 25 in response to the water level within the water pitcher 20 rising or falling, respectively.

The auxiliary column 25 may be closed off at its base 25A so as to deter the float assembly 60 from exiting the auxiliary column therefrom. Furthermore, the auxiliary column 25 may be closed off at its top 25B so as to deter the float assembly 60 from exiting therefrom, although there may be an opening to enable pressure equalization between the interior of the auxiliary column 25 and the environment. As shown in FIG. 8, the top 25B of the auxiliary column may be permanently or removably fixed to the cover 28 of water pitcher 20. Alternatively, the auxiliary column 25 may be affixed directly to pitcher 20, either with permanent or reversible fixing means.

Figure 9:
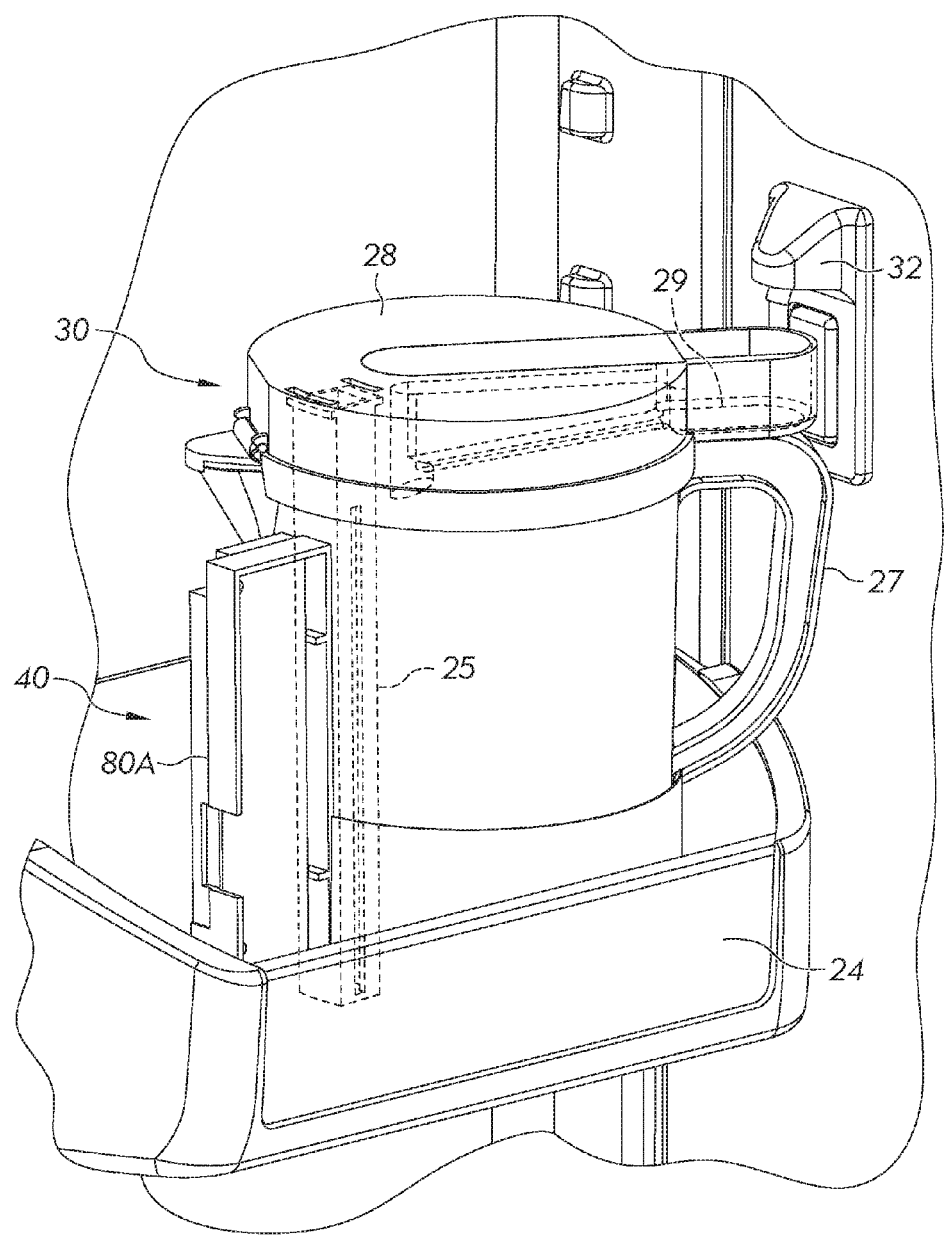
FIG. 9 is a perspective view of a refrigerator door with an example water pitcher according to the further embodiment.

Portions of the base and/or sidewalls of the auxiliary column 25 may contain openings 25C in the shape of pinholes, slots, slits, or other geometries, so as to allow water to freely circulate between the auxiliary column 25 and the water pitcher 20, so that the water level within the auxiliary column 25 substantially matches the water level within the water pitcher 20 at all times. In one example, as shown in FIG. 9, said openings 25C may be provided as an elongated slot which extends over a substantial length of the column, for example 50% or more, 75% or more, 80% or more, etc. of the length of auxiliary column 25. To enable pressure equalization, in this example, the slot may extend above the maximum fill level of the liquid within the pitcher 20. In any case, said openings 25C may be dimensioned so as to prevent float assembly 60 from escaping from the auxiliary column 25. Alternatively or in addition, said openings 25C may be covered with a fluid-permeable material. In case the dimensioning of said openings 25C is such that the float assembly 60 could pass through said openings 25C, then said fluid-permeable material may be used to cover said openings 25C and prevent the escape of float assembly 60 from the auxiliary column. Said auxiliary column 25 may even be constructed entirely of the fluid-permeable material, so as to simultaneously form a structural barrier to enclose the float assembly 60 while allowing water to circulate freely between the auxiliary column 25 and the water pitcher 20. In this case, it may be that no further openings are necessary.

A vertical length of the auxiliary column 25 may be substantially equal to a height of the water pitcher 20. In this case, the base 25A of the auxiliary column 25 may be substantially flush with a base 20A of the water pitcher 20. Alternatively, the vertical length of the auxiliary column 25 may be less than the height of the water pitcher 20. In this case, the base 25A of the auxiliary column 25 may be located above the base 20A of the water pitcher 20. In this case, the float assembly 60 cannot move below the base 25A of the auxiliary column 25, but can rise in response to the water level exceeding a level of the base 25A of the auxiliary column 25. Alternatively or in addition, the top 25B of the auxiliary column 25 may be located below a top 20B of the water pitcher 20. However, if the top 25B of the auxiliary column is not flush with an interior of the cover 28 of pitcher 20, then alternative fixing means for the auxiliary column 25 may be provided. In this case, the float assembly 60 cannot move above the top 25B of the auxiliary column 25, but can sink in response to the water level falling below a level of the top 25B of the auxiliary column 25. The base 25A and top 25B of the auxiliary column may define the bounds of vertical movement of the float assembly 60, and thereby define the maximum water level and minimum water level within the water pitcher 20 that can be sensed by sensor 40.

The auxiliary column 25 may be located within water pitcher 20. In particular, the auxiliary column 25 may be positioned within the water pitcher 20 such that the auxiliary column 25 is located at a predefined proximity relative to the magnet detection sensors 40A-1 to 40A-4 when the water pitcher 20 is retained in position on the shelf 24. In one example, the auxiliary column 25 may be attached or affixed to the cover 28 of the water pitcher 20. In particular, the top 25B of auxiliary tube 25 can be provided with a snap on attachment, a sliding attachment which may include a snap feature lock, or a screw thread which mates to corresponding attachment parts 28B within the cover 28. The attachment parts 28B can be provided at a portion of the cover 28 selected so as to ensure that the auxiliary column 25 is close to a wall of the pitcher 20 when the cover 28 is applied to the pitcher 20. More particularly, the attachment parts 28B can be provided such that the auxiliary column 25 is positioned close to the magnet detection sensors 40A-1 to 40A-4 when the pitcher 20 is positioned on the refrigerator door 16 with the cover 28 on.

Furthermore, the cover 28 may comprise a fill cup 29 to aid in filling the pitcher. The fill cup 29 may be located above the handle 27 of the pitcher 20. However, the fill cup 29 may also be located at any other position along the edge or even toward the middle of the cover 28. The fill cup 29 is fluidly connected to the interior of the pitcher 20, such as via a through hole, passage, or to an inclined channel (indicated with dashed lines in FIG. 9) provided on a lower side of cover 28 in order to allow liquid in the fill cup 29 to drain into the pitcher 20 via the inclined channel.

Referring now to FIG. 9, the cover 28 can be designed so that a positioning of the fill cup 29 is such that when the pitcher 20 is properly located on the refrigerator door, the fill cup 29 is located under the spout 32. Preferably, the cover 28 is designed so that a relative positioning of the fill cup 29 and the cover attachment parts 28B for the auxiliary column 25 is such that, when the pitcher 20 is placed on the inner surface 22 of the refrigerator door 16, then the auxiliary column 25 is located at a fixed proximity to the sensors 40A-1 to 40A-4, while the fill cup 29 is located under the spout 32. In other words, the relative placement of the spout 32 and the sensor 40 on the refrigerator door determines the relative placement, on the cover 28, of the fill cup 29 and the attachment parts 28B for the auxiliary column 25. When the cover 28 is applied to the pitcher 20 to close off the top of the pitcher 20, a form-fitting connection may be provided between the pitcher walls and the cover 28 such that the cover 28 can only be applied to the pitcher 20 when the pitcher 20 and cover 28 are correctly oriented with respect to each other. Alternatively, the pitcher 20 may have a substantially cylindrical form, in which case the cover 28 can be applied to the pitcher 20 in any orientation. In case the pitcher 20 and cover 28 have a form-fitting closure, a keying mechanism 24A as shown in FIG. 8 can be provided on an exterior of base 20A or walls of pitcher 20. The keying mechanism 24A can be designed to mate with a corresponding keying mechanism provided on a corresponding surface of shelf 24. In this way, when the pitcher 20 is placed on shelf 24, then the keying mechanism 24A can mate with the corresponding keying mechanism of shelf 24 only in a predetermined orientation, thus ensuring that the pitcher 20 (and its form-fitting cover 28) are placed in a desired orientation. In particular, the desired orientation is an orientation in which the spout 32 and fill cup 29 are aligned, and further in which sensors 40A-1 to 40A-4 and auxiliary column 25 are aligned.

The float assembly 60 may comprise a magnetic element 60A which may be attached to, enclosed by, embedded in, or affected by a buoyant material 60B. The attachment between the magnetic element 60A and the buoyant material 60B may be a form-fitting attachment, over-molding or co-molding, or they may be attached by means of screws, adhesives, welding, snap-fitting connections, or other known equivalents. In one example, the float assembly 60 may be formed as a hollow tube filled with air, into which a magnet can be placed at a specified position. Then the tube can be formed of two parts, such as two halves, which are sealed together in a non-leaking manner using ultrasonic welding, adhesives, or the like, so that the air (which in the example shown in FIG. 8 constitutes buoyant material 60B) and magnet 60A are trapped inside. In general, the magnetic element 60A may be a permanent magnet, such as a neodymium magnet or a permanent magnet formed of other material(s). If a solid or liquid material is used for the buoyant material 60B, it should preferably be a material that is non-soluble in water or, if the pitcher 20 is filled with another liquid, in that liquid. The float assembly 60 and/or buoyant material 60B may optionally feature anti-microbial material(s). Furthermore, the float assembly 60 and buoyant material 60B is preferably a material that will not substantially alter or disrupt the magnetic field of the magnet of the float assembly 60. The buoyant material 60B may actually be a mixture of materials which may comprise multiple phases, such as a foam, or one or more gas bubbles enclosed by a non-soluble membrane. Furthermore, the specific density of the buoyant material 60B and the shape of the float assembly 60 can be chosen such that the float assembly 60 floats on the surface of the water or other liquid within the auxiliary column 25. In other words, the float assembly 60 is preferably designed to be less dense than the liquid (i.e., less dense than water) in the pitcher 20 so that it floats on the surface of the liquid. More particularly, the float assembly 60 may be designed such that the location of the magnet 60A within the float assembly 60 may substantially match the water level within the auxiliary column 25. A shape of the float assembly 60 may be a sphere or any other regular or irregular geometry, such as a rectangular or polygonal prism, or a curved, oval, cylindrical, or other 3D shape. In one example, the float assembly 60 can be shaped as a circular pellet, with a circumference that generally corresponds to or is slightly smaller than a circumference defined by inner sidewalls of the auxiliary column 25. In other words, the float assembly 60 can be shaped to fit within the auxiliary column 25 with enough leeway to allow the float assembly 60 to move freely in an upward or downward direction within the auxiliary column 25, in response to the water level within the water pitcher 20 rising or falling, respectively.

In addition or alternatively, one or more capacitive sensors 66-67 can be provided to sense a presence of the water pitcher 20 adjacent to the liquid dispenser. For example, a pair of capacitive sensors 66-67 can be located variously on the sensor 40, such as towards the bottom, to sense whether the water pitcher 20 is located adjacent to the sensor 40. Although it is possible to use only a single capacitive sensor, the use of a plurality of capacitive sensors can inhibit a false-positive reading, especially if a container other than the water pitcher 20 is placed on the shelf 24. For example, the plurality of capacitive sensors 66-67 can be located on the sensor 40 in a spaced-apart relationship so as to correspond generally to the geometry of the water pitcher 20. It is contemplated, however, that one or more of the level-sensors 40A-1 to 40A-4 could also be used to sense presence of the water pitcher 20 adjacent to the liquid dispenser. For example, any detection of the magnet 60A in the float assembly 60 by any of the level-sensors 40A-1 to 40A-4 can indicate that the pitcher 20 is properly situated adjacent to the liquid dispenser. Additionally, the plurality of capacitive sensors 66-67 (and/or others of the sensors 40A-1 to 40A-4) could be used to determine a type or size of the water pitcher 20 to be filled.

In addition or alternatively, and similar to the first embodiment, the refrigerator 10 can further include a user input configured to select one of a plurality of different fill amounts of liquid within the water pitcher 20. Thus, a user can have a "full" water pitcher that is filled to a predetermined level that may be fixed or alterable. A user can have the water pitcher 20 automatically filled to a predetermined level, such as 50%, 75%, 100%, or other amount of the total available volume of the water pitcher 20. Similar to the first embodiment, one or more capacitive sensors 68-69 can be provided to receive a user input to enable the user to select one of the desired fill amounts of liquid within the water pitcher 20. The location of the capacitive sensors 68-69 can be adjacent to the actual liquid level contained within the water pitcher 20 when it is located on the shelf 24. Thus, a user can intuitively touch an area on the sensor 40 adjacent to the water pitcher 20 that corresponds to the amount of liquid fill level desired. Alternatively, the user input can include other types of switches, such as a membrane switch, push-button switch, computer-generated capacitive soft keys displayed by a LCD, OLED or other type of display, tactile buttons, multi-position switches, knobs, or any other input device that is operable to input a user selection, and/or can even be selected as part of the user interface 19 of the refrigerator 10. Upon selecting a desired fill level, the control 50 can operate the actuator 34 to permit the water pitcher 20 to be filled via the spout 32 until the desired amount of water (i.e., a predetermined "full" water pitcher amount) is sensed by the interaction of the level-sensors 40A-1 to 40A-4 and the float assembly 60 within the water pitcher 20.

Further, and similar to the first embodiment, a feedback system can be configured to indicate at least one of a current amount of liquid in the water pitcher 20 and a selected amount of liquid in the water pitcher 20. For example, the feedback system can include at least one visual indicator 75, or a plurality of visual indicators 71-72. The visual indicator 75 can be a light, such as an LED light or the like, more particularly a colored LED such as an LED comprising one or more red, green and/or blue components. In one example, the visual indicator 75 can be positioned on a back plate 80A, adjacent to the water pitcher 20. For example, the indicator 75 can illuminate in response to the user placing the pitcher 20 on a shelf 24 in the correct orientation. In addition or alternatively, the visual indicator 75 can be used to illuminate the current amount of liquid in the water pitcher 20. In addition or alternatively, the indicator 75 can blink when the water pitcher 20 is sensed to be absent from the shelf 24, and can stay illuminated once the water pitcher 20 is sensed as being docked onto the shelf 24 adjacent the sensor 40. In still a further embodiment, the indicator 75 can be used to simply illuminate the water pitcher 20 and its contents with a pleasing color, which may be static, changeable, user selectable, etc.

In addition or alternatively, another feedback system can be configured to indicate a stale liquid condition when the water pitcher 20 has not been removed from the door after a predetermined amount of time has elapsed. Liquid contained in the water pitcher 20, such as water, can become stale, undesirable, and/or unsanitary if the water pitcher 20 is not removed from the shelf 24 and used for a long period of time. Thus, the feedback system can monitor the amount of time the water pitcher 20 is on the shelf 24 without being removed, and alert the user after a predetermined amount of time has elapsed. As noted above, removal and insertion of the water pitcher 20 from the door can be sensed by detection of the float assembly 60 by any of the level-sensors. The predetermined amount of time could be preset, or could even be adjustable by the user via the user interface 19 or other user input. The predetermined amount of time could be a few days, a week, two weeks, or other value generally related to an amount of time for the water to become stale, undesirable, and/or unsanitary. The feedback system can include at least one visual indicator, and preferably a plurality of visual indicators 73-74. The visual indicators 73-74 can be lights, such as LED lights or the like, positioned to be easily observable by a user when the water pitcher 20 is retained on the shelf 24. One light 73 can be used to indicate a stale water condition, and can be illuminated in an appropriate red or orange color. The other light 74 can be used to indicate an acceptable water condition, and can be illuminated in an appropriate green or blue color. Of course, various other colors can be used, and/or a single light or LED capable of emitting multiple colors could also be used. Other types of feedback systems can be used, such as sound feedback and/or tactile feedback (e.g., vibration, etc.). It is further contemplated that the indicator could be part of the user interface 19. In addition or alternatively, the indicators 73-74 can blink when the water pitcher 20 is sensed to be absent from the shelf 24, and can stay illuminated based once the water pitcher 20 is sensed as being docked onto the shelf 24 adjacent the sensor 40.

The magnet detection sensors 40A-1, 40A-2, 40A-3 and 40A-4 can be coupled to a backplate 80A located within or adjacent to the water pitcher 20. Said backplate 80A can provide structural support for sensor 40, similar to the structural support provided by the dielectric plate 80 in the first embodiment. However, in this further embodiment, the backplate 80A can merely serve as a structural member and does not necessarily possess dielectric properties. Although the magnet detection sensors 40A-1 to 40A-4 are illustrated on a surface of the backplate 80A, it is contemplated that these sensors could be behind the surface, or otherwise incorporated, embedded, or encapsulated in the backplate 80A. Of course, the material used for the backplate 80A should not interfere with the signals transmitted or received by magnet detection sensors 40A-1 to 40A-4, e.g., not a ferromagnetic material (e.g., not iron, steel, nickel, or cobalt) and/or radio-transparent. If the backplate 80A incorporates capacitive sensors 68-69 to receive a user input to enable the user to select one of the desired fill amounts of liquid within the water pitcher 20, then it may be appropriate to provide a backplate 80A which is a dielectric plate. Similarly, if one or more capacitive sensors 66-67 is provided to sense a presence of the water pitcher 20 adjacent to the liquid dispenser, then it may be appropriate to provide a backplate 80A which is a dielectric plate. Some or all of the backplate 80A, capacitive sensors 66-69, control 50 and electrical connections, spout 32, actuator 34, and/or associated water lines can be foamed-into the refrigerator door during the manufacturing of the refrigerator. Alternatively, some of these elements may be attached to internal mounting structure after the refrigerator door liner and/or insulating foam has been installed. According to a further alternative, some of these elements could be mounted behind the door liner, or preferably in front of the door liner in a recessed pocket on the door interior and protected by a removable cover. The backplate 80A can be formed of various materials that generally will not interfere with the operation of the magnet detection sensors 40A-1 to 40A-4. The backplate 80A can have a geometry corresponding to the geometry of the water pitcher 20. For example, the backplate 80A can have a generally planar geometry with a face 82 (see FIG. 4) configured to engage an external side wall of the water pitcher 20. Still, the geometry of the backplate 80A can closely correlate to the external geometry of the water pitcher 20 adjacent thereto so that the backplate 80A mates closely with the water pitcher 20. It is contemplated that the geometry of the backplate 80A could closely correlate but not touch the external geometry of the water pitcher 20 so as to provide an air gap therebetween. The face 82 of the backplate 80A can be made of a material and/or have surface features that are compatible with the external side wall of the water pitcher 20, so as not to cause damage or scratching of the water pitcher 20 via contact. The face 82 may also have cutouts for the magnet detection sensors 40A-1, 40A-2, 40A-3 and 40A-4, so that these sensors are recessed from an external side wall of the water pitcher 20 so as not to scratch or damage the side wall.

Additionally, if the backplate 80A incorporates capacitive sensors 68-69, the backplate 80A can be biased towards the water pitcher 20. Said biasing can, for example, be accomplished with any of the biasing means described above with respect to the first embodiment. However, the use of the magnet detection sensors 40A-1, 40A-2, 40A-3 and 40A-4 may obviate the use of biasing members for the backplate 80A, since these sensors can operate at a distance from the object to be detected and the operational performance thereof is not substantially degraded by an intervening air gap with the water pitcher 20.

It is further contemplated that the filling mechanism could be disabled until the water pitcher 20 is detected by the sensor 40. In other words, before the pitcher 20 is automatically refilled with liquid, the controller 50 can check that the pitcher 20 is present. In addition or alternatively, the exterior surface of the water pitcher 20 can include one or more projections 83 configured to engage the face 82 of the back plate 80A to provide orientation based upon sloping or other geometry of the water pitcher 20 that may or may not match that of the face 82 of the back plate 80A. Alternatively, the form of the pitcher 20 can be designed to match a space in the pocket on the door shelf 24, so as to provide alignment. In any case, when the water pitcher 20 is in place, a fill cup 29 provided in the cover 28 is located underneath spout 32. It is also contemplated that the water filling procedure can immediately stop if the refrigerator door is opened by the consumer while the pitcher is being filled.

An example method of operation can include some or all of the following steps. The steps can be implemented via the control 50 or main controller of the refrigerator 10. The sensor 40 can sense the presence of the water pitcher 20 on the shelf 24 of the interior surface 22 of the door 16A, 16B, such as via the capacitive sensors 66-67 or via detection of the float assembly 60 by one or more of the magnet detection sensors 40A-1, 40A-2, 40A-3 and 40A-4. Preferably, the system is designed in such a way that only the specific pitcher can activate it, whereby it cannot be activated by normal food or other container or pitcher. The use of the magnetic float assembly 60 can help in this regard, as most normal food items that a consumer will place within the refrigerator do not have an inherent magnetic field. The sensor 40 can also sense a presence of liquid within the water pitcher, such as via the capacitive sensors 61-65 or via detection of the float assembly 60 by one or more of the magnet detection sensors 40A-1 to 40A-4. More particularly, a reading can be taken to sense a current level of liquid within the pitcher 20 prior to a filling operation. In one example, the filling mechanism could be disabled until the water level detected by the sensor 40 is below a predetermined amount to avoid an overfill condition. Next, the control 50 can operate the actuator 34 to selectively permit dispensing of the liquid into the water pitcher 20 via the spout 32. The liquid dispensing can continue until the predetermined "full" water pitcher 20 is sensed by the sensor 40, and then closes the actuator 34 to stop the flow of liquid from the spout 32. Additionally, the control 50 could selectively adjust the actuator 34 to increase or decrease the liquid flow rate from the spout 32 based upon the amount of liquid contained in the water pitcher 20 and/or sensed rate of change of liquid amount in the water pitcher 20. For example, the control 50 could cause a relatively empty water pitcher 20 to fill faster, while slowing the filling rate when the water pitcher 20 is nearing a "full" condition.

After sensing the presence of the water pitcher 20 and the presence of liquid therein, the control 50 can initiate a timer. The timer can be set to countdown from the predetermined amount of time (e.g., a few days, a week, two weeks, or other value). The timer can be initiated at the start or the completion of the filling operation. Thereafter, the control 50 can indicate a stale liquid condition if the timer expires before the water pitcher 20 has been removed from the door 16A, 16B, such as removed from the shelf 24. The stale liquid condition can be indicated by the lights 73, 74, user interface 19, or other manner.

The method can include various additional steps. For example, the sensor 40 can sense an absence of the water pitcher 20 on the interior surface 22 of the door 16A, 16B. For example, the capacitive sensors 66-67 or one or more of the magnet detection sensors 40A-1 to 40A-4 can sense that the water pitcher 20 has been removed from the shelf 24. Afterwards, the timer can be reset once the presence of the container is subsequently sensed on the interior surface of the door. For example, once the capacitive sensors 66-67 or magnet detection sensors 40A-1, 40A-2, 40A-3 and/or 40A-4 sense that the water pitcher 20 has been replaced onto the shelf 24, the timer can be reset back to its original value, and can restart the countdown. In addition or alternatively, it is also contemplated that the timer could be initiated after each time liquid is dispensed into the water pitcher 20. For example, the liquid can be dispensed into the container, and thereafter the timer can be reset once the liquid dispensing is complete.

It is contemplated that the fill mechanism could also be used as a manual water dispenser for filling a user's glass when the water pitcher 20 or carafe is not in use. For example, whether or not the refrigerator contains an external water dispenser, the internal fill mechanism could be used as a manual water fill dispenser. For example, a manual operation button (not shown) could be provided to operate the control 50 and/or actuator 34 to manually dispense water from the spout 32. Still, the fill mechanism could be locked until the sensor 40 determines a water pitcher 20 or other suitable container is located below the spout 32. It is further contemplated that the fill mechanism could be utilized with an external water dispenser 90 (see FIG. 2) located on an exterior or side edge 17 of the door 16A, 16B to dispense water through the door. A button 92, motion sensor, etc. or other suitable input device can be provided in communication with a control configured to operate an actuator to dispense water or another liquid via the dispenser 90 when the button 92 or other input device is manipulated. The liquid supply to the dispenser 90 can be the same or different as the spout 32 for the water pitcher 20, and may similarly be filtered and/or chilled. In addition or alternatively, a dispenser 96 (see FIG. 6A) could be provided on the exterior front side of the door 16B.

If the fill mechanism is located on the inside of the refrigerator door, one or more water lines can be provided to the refrigerator door to provide the water supply for the fill mechanism and/or a separate exterior water dispenser. A control system, operation controls, supply valves and the like for controlling the flow of water can be located in close proximity or even remotely from the fill mechanism. It is further contemplated that the water pitcher or carafe could further include a manual spout for filling a user's water glass from the water contained in the pitcher or carafe without requiring the user to remove the water pitcher or carafe from the door. It is further contemplated that an ice dispenser could be combined and/or utilized with the fill mechanism. The ice could be dispensed via the dispenser 90 or inside the refrigerator.

In addition or alternatively, it is contemplated that one or more sensors (not shown) could be provided to sense an overflow and/or spilled water condition in the recess of the shelf 24. For example, upon sensing an overflow or spilled water condition, the control 50 can close the actuator 34 to stop dispensing liquid from the spout 32, and notify the user of a spilled water condition. The control 50 can maintain the actuator 34 in the closed position until the user rectifies the spilled water condition.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. An improved refrigerator having a cabinet defining a fresh food compartment, a door pivotally mounted to the cabinet and comprising an interior surface in communication with the fresh food compartment when the door is closed, and a container supported on the door and configured to receive liquid from a liquid dispenser located within the fresh food compartment, the improvement comprising:
    an array of sensors configured to sense a property of the container, wherein the sensors each utilize a magnetic sensing element located adjacent to the container;
    a magnetic body provided within the container that is detectable by the magnetic sensing elements in the array of sensors,
    wherein the magnetic body is exposed to the liquid within the container, is less dense than the liquid within the container, and is further movable along a height of the container;
    wherein each magnetic sensing element provides a variable output that varies according to a strength of a sensed magnetic field, which corresponds to the height of the magnetic body;
    wherein the array of sensors is defined by the magnetic sensing elements being arranged at different heights corresponding to fractions of a height of the container; and
    an electrically operated control in communication with the array of sensors and configured to regulate dispensing of liquid into the container based upon the variable outputs of the magnetic sensing elements in the array of sensors.

2. The improved refrigerator of claim 1, wherein each magnetic sensing element comprises a detection zone whereby a value sensed by each respective magnetic sensing element will be non-zero when the magnetic body is located within said detection zone.

3. The improved refrigerator of claim 2, wherein two adjacent detections zones of a selected two adjacent magnetic sensing elements are positioned to overlap such that values sensed by both of said selected two adjacent magnetic sensing elements will be non-zero when the magnetic body is located in both of said two adjacent detections zones.

4. The improved refrigerator of claim 3, wherein the magnetic body is arranged within an auxiliary column located within the container, and
    wherein said auxiliary column is positioned within the container, relative to the array of sensors, so that the magnetic body is always exposed to at least two detection zones of the magnetic sensing elements.

5. The improved refrigerator of claim 4, wherein the auxiliary column is in fluid communication with the container, so that a surface level of the liquid is the same within both the auxiliary column and the container.

6. The improved refrigerator of claim 1, wherein the property sensed by the magnetic sensing elements is an amount of liquid within the container.

7. The improved refrigerator of claim 1, wherein the liquid dispenser is arranged on the interior surface of the door.

8. The improved refrigerator of claim 1, wherein the magnetic sensing elements span a portion or all of the height of the adjacent container.

9. The improved refrigerator of claim 1, wherein the magnetic body comprises a permanent magnet coupled to a buoyant substance that is selected such that an overall density of the magnetic body is less than a density of the liquid in the container.

10. The improved refrigerator of claim 1, further comprising an electrically-operated actuator operated by the control and configured to selectively permit dispensing of the liquid via the spout.

11. The improved refrigerator of claim 1, further comprising a user input configured to select one of a plurality of different fill amounts of liquid within the container.

12. The improved refrigerator of claim 1, further comprising a feedback system configured to indicate at least one of a current amount of liquid in the container and a selected amount of liquid in the container.

* * * * *